Feb. 15, 1944. G. D. EVANS Re. 22,435

WING LOCKING PIN WARNING DEVICE

Original Filed May 8, 1940 2 Sheets-Sheet 1

INVENTOR
GEORGE DORSEY EVANS
BY W. Glenn Jones
ATTORNEY

Feb. 15, 1944. G. D. EVANS Re. 22,435

WING LOCKING PIN WARNING DEVICE

Original Filed May 8, 1940 2 Sheets-Sheet 2

INVENTOR
GEORGE DORSEY EVANS
BY William Jones
ATTORNEY

Reissued Feb. 15, 1944

Re. 22,435

UNITED STATES PATENT OFFICE 22,435

WING LOCKING PIN WARNING DEVICE

George D. Evans, Jenkintown, Pa.

Original No. 2,280,809, dated April 28, 1942, Serial No. 334,140, May 8, 1940. Application for reissue January 8, 1943, Serial No. 471,768

16 Claims. (Cl. 116—124)

(Original patent granted under the act of March 3, 1883, as amended April 30, 1928; 370 O. G. 757)

The present invention relates to a wing locking pin warning device adapted for use with airplanes having folding wings or other folding parts.

It is an object of the present invention to provide a locking pin or bolt, hereinafter called the "lock bolt" or "lock-pin," in combination with mechanism having means for giving positive indication that such parts are securely locked, following a full movement of said bolt in locking direction after, for example, an outer wing panel has been lowered and brought into line with a fixed wing portion of the airplane. This latter portion, sometimes called the "stub wing," will be hereafter called the "center panel."

Another object of the present invention is the provision of means in an airplane for operating the lock bolt and, at the same time, for giving a warning when the relatively movable fuselage, wing or other parts of the airplane are not mated and hence are unlocked despite an actuation of said bolt for locking.

A still further object of the present invention is the provision of means for adjusting a warning or signalling device of the kind referred to.

Other objects and advantages will become apparent as the description proceeds and is taken in connection with the accompanying drawings showing, by way of example, an embodiment of the invention as now favored, and as applied to a folding-wing airplane. In said drawings.

Figure 1:
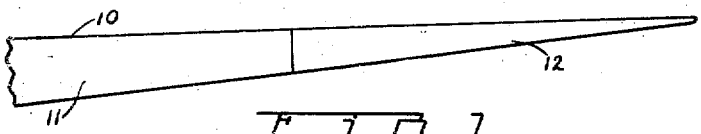
Fig. 1 is a diagrammatic elevational view of a foldable airplane wing in unfolded or extended flying condition.

Referring now to the drawings in detail, the numeral 10 represents the wing of an airplane including an inner or center panel 11 and a folding outer panel 12. Secured to an end wall 13 of inner panel 11 by rivets 14 is a vertical strap 15 having near its top a pair of spaced apertured ears 16 and near its bottom a similar pair of such ears 17. To one of the ears 17 is secured, in any suitable manner, a barrel 18 in which is housed for slidable movement a lock bolt or lock-pin 19. The outer panel 12 carries a vertical strap 20 riveted to the end wall 21 of the panel 12, by rivets 22, and provided near its bottom with an apertured ear 23, and near its top with a similar ear 24. Offside from the ear 24 is a contact plate 25, riveted to end wall 21. The ears 16, 16 and 23 co-act with a pintle 26 to hinge the two wing panels together near the top of the wing.

After the outer panel 12 has been swung down about said hinge for alignment with the center panel 11 and so that the outer panel's upper ear 24 enters the space between the ears 17 near the bottom of the center panel, it is necessary to lock the two panels together near their bottoms. This is accomplished, as heretofore proposed, by longitudinal movement of a lock-bolt. Here, that lock-bolt is the bolt 19.

If, when such bolt is shot home, it passes through all the three apertures in the three ears 17, 24 and 17, the wing is securely locked in extended condition. But it sometimes happens that shooting home of the bolt fails of its intended purpose, due to the fact that although the outer panel has been swung down, and, to the pilot's eye, fully swung down, that is, swung down far enough for proper mating of the ear 24 with the ears 17, actually the mating has been only an incomplete one. In such case, shortly after taking off, the outer panel swings up away from the center panel, to precipitate a crash landing. The danger has been aggravated by the fact that in attempts to preclude accidents of this kind, it has been the practice to employ a visual signal having one characteristic appearance or position when the bolt is in retracted position, and another and different appearance or position when the bolt has been shot home.

Figure 4:
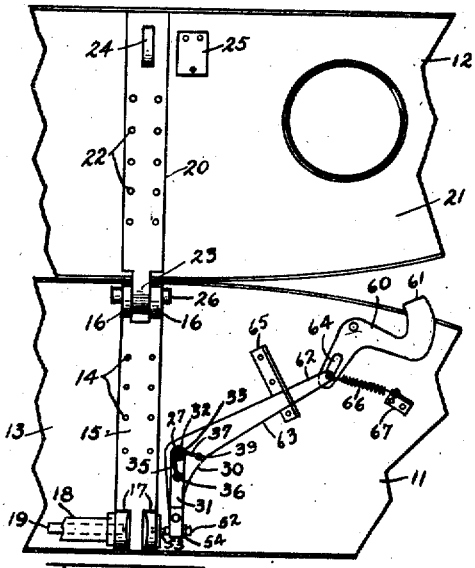
Fig. 4 is a view similar to Fig. 3, and showing the normal position of the parts, with the lock bolt retracted.

The present invention has been made with the idea of overcoming difficulties, with a folding wing or other folding member, of the kind just noted. Preferably there is employed such a signal, here illustrated at 61, as a visual one. In Fig. 4 the signal 61 is shown in its "wing-unlocked" position, and in Fig. 5 in its "wing-locked" position. Essentially, however, the invention comprises the combination of a lock-bolt or equivalent, a keeper therefor and a part or parts of which keeper are carried by one panel and a part or parts of which keeper are carried by the other panel, a signal or indicating means, an operative connection between the lock bolt and said means and responsive to a full movement of the bolt in locking direction to cause said means to indicate that locking has been accomplished, and a monitoring means for rendering said operative connection ineffective whenever the bolt has been given full movement in locking direction, yet without properly engaging all the keeper parts on both panels. In the structure here shown, and as now believed to be also an essential of the invention, said monitoring means incorporates coacting elements, one or more of which are carried by one panel, and one or more carried by the other panel.

With the above as a preliminary, the structural description of the exemplifying embodiment of the invention selected for illustration in the accompanying drawings will be resumed.

Figure 6:
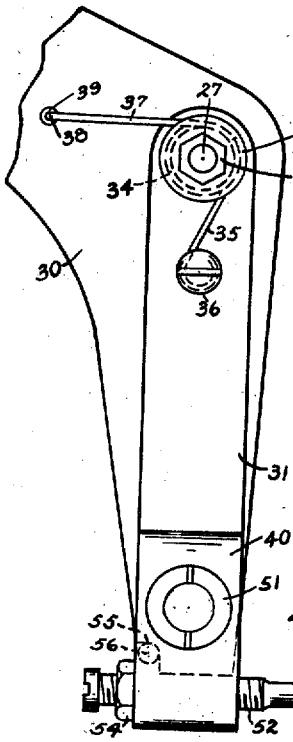
Fig. 6 is an enlarged view of certain of the parts shown in Figs. 3 through 5, with these parts disposed as in Fig. 4.
Figure 7:
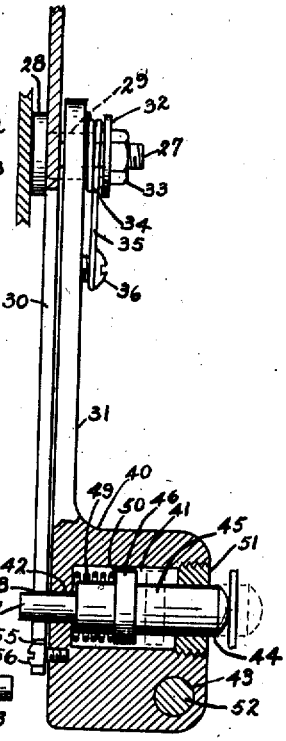
Fig. 7 is an elevational view looking toward the right in Fig. 6, but partially in section, so as to show a structural feature of the safety arm for resiliently reciprocally carrying a pin having a monitoring function relative to a main actuator for the signalling means, said actuator here illustrated as a bell-crank having a pin-and-slot connection to such a signalling means of the visual type.

Referring to Figs. 4, 6 and 7, the end wall 13 mounts a stud 27 carrying a collared sleeve 28 on the portion 29 on which are pivoted, for either simultaneous or relative swing, as the case may be, a bell-crank 30 and a safety arm 31. The sleeve 28 is held fixed on said stud 27 by means of a nut 33 engaging a thread on the stud and in back of which is a washer 32.

The bell-crank 30, as already pointed out, is part of an operative connection to the signalling means. The safety arm 31 is an element of the monitoring means.

Figure 3:
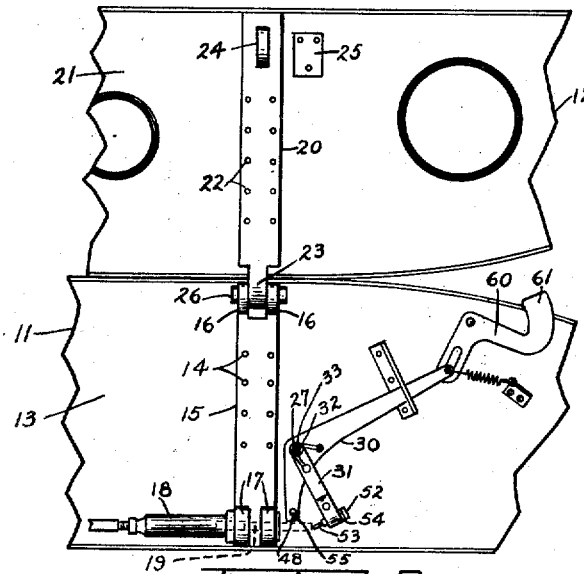
Fig. 3 is a fragmentary, enlarged detailed end view, looking in the direction of the arrow in Fig. 2 and illustrating a setting of the parts which would be brought about should the lock bolt be shot home at a time when the outer panel, here shown not yet lowered, has been lowered yet not properly mated to the center panel.

The safety arm 31 is shown in Fig. 3 in an exaggerated position indicative of its movement relative to the bell-crank 30 when the lock bolt 19 is shot home but with the wings not mated.

For urging the safety arm 31 into normal parallelism with the pendant arm of the bell-crank 30, there is provided behind the washer 32 a spring 34 coiled about the sleeve portion 29, and having a leg 35 secured to the safety arm 31 as at 36, and a leg 37 with a hooked end 38 engaging a hole 39 in the bell crank 30.

The lower end of the safety arm 31 is formed as a block having a bore 41, a reduced bore 42 and a threaded bore 43. A monitoring pin 44, having a main shank 45, interrupted by an annular rib 46, and a reduced shank 47, is mounted in the bore-cavity of the block 40 as shown in Fig. 7. The reduced shank 47 of this pin is thrustable into an opening 48 through the bell crank 31; but said shank is normally held out of and restrained against entry into said opening by an expansile spring 49. The mouth of the bore 41 is threaded to receive a retaining nut 51 having a central smooth bore for taking the outer section of the shank 45 of the monitoring pin.

In the threaded bore 43 is an adjustment bolt 52 having a reduced end 53 and securable in adjusted position by a nut 54.

As seen best in Fig. 6, the lower left-hand corner of the pendant arm of the bell-crank 30 is cut-out as shown at 55 for co-action with a fixed stop 56.

Pivotally mounted on the wall 13 is a substantially Z-shaped member 60 having a terminal portion 61 serving as a warning flag and constituting a visual-type signalling means. Pivoted to the lower end of the member 60 is the upper end 62 of the upper arm 63 of the bell-crank 30, the connecting pivot being slidable in a slot 64 in said member 60. Said arm 63 extends through a suitable slot (not shown) in a guide plate 65 secured to the wall 13. A retractile spring 66 connects the bell-crank 30 and a fixed anchor plate 67 as shown.

Figure 9:
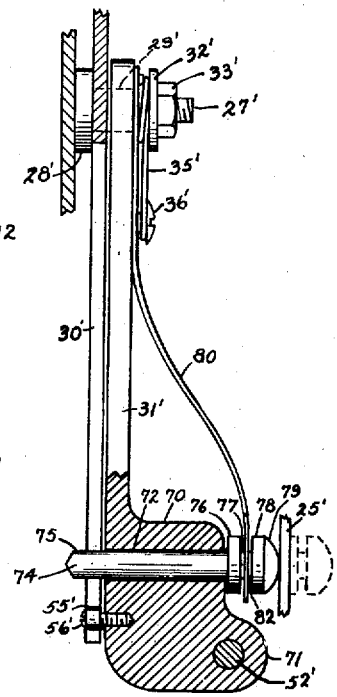
Fig. 9 is a view similar to Fig. 7, but illustrating the modification of Fig. 8.
Figure 8:
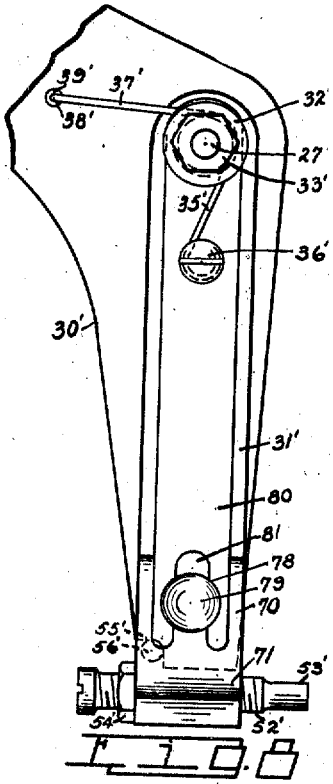
Fig. 8 is a view similar to Fig. 6, illustrating a modification of the assemblage last above described in that the resilient attendant for said pin is a leaf spring rather than a wire coil spring as in Figs. 6 and 7.

Referring to the modification shown in Figs. 8 and 9, the block 70 on the safety arm 31' has a rotund bulge 71 and is provided with a straight bore 72 for slidably taking the shank 74 of a monitoring pin 75. This pin also includes a minor head 76, an annular groove 77, and a major head 78 having a convex face. The spring for acting on the monitoring pin is here a leaf-spring 80, apertured at its top to be there mounted on the sleeve 28, and pierced somewhat below its top to be further secured by a screw 36' going into the safety arm 31', and bifurcated near its lower end at 81 for engaging the annular groove 77 of the monitoring pin.

In both Figures 7 and 9, that is, in the exemplifying apparatus of the invention here illustrated in Figures 1 through 7, and in the modification selected for illustration in Figures 8 and 9, the monitoring means is supervisingly associated with the operative connection between the lock-bolt 19 and the signal 61 or 61'. This monitoring means, as aforesaid, includes the monitoring pin 44 or 72. The function of this pin is to lock the safety arm to the bell crank, to cause swinging of the former to result in simultaneous and similar swinging of the latter, by thrust of the monitoring pin into the hole provided therefor as at 48 in Figure 7. Normally, as has already been explained, the pin is urged out of engagement with said hole by a suitable spring; in the case of Figure 7 by the coil spring 49, and in the case of Figure 9 by the leaf spring 80.

Whenever, with the normal action of such a spring or equivalent not interfered with, the lock bolt 19 is shot home, as when the two wing panels are not properly mated, the signal 61 or 61' will continue to project above the top surface of the wing, as in Figures 3 and 4, and will give warning that the wing panels are unlocked.

However, following a lowering of the outer wing panel to properly mate all the ears or bolt-keepers 17, 24 and 17, shooting home of the bolt 19 will change the signal 61 or 61', by withdrawing it to substantially a non-projectant position, and hence advise that the wing panels are securely locked together. This is so, because then, before the bolt was shot home, the contact plate 25 on the outer panel had been brought down against the monitoring pin 44, Figure 7, or, as indicated at 25' in Figure 9, against the monitoring pin 72, and had been advanced toward the left in Figures 7 and 9 a sufficient distance to thrust said monitoring pin from its normal position indicated in broken lines to its full line position in this view, that is, to lock together the safety arm 31 (or 31′) to the bell crank 30 (or 30′). The arrangement of the parts is such that when the contact plate is moved said sufficient distance, the outer panel 12 has been swung down not only into apparent alignment with the center panel 10, but also into proper mating relation with the latter, so that the aperture of ear 24 is aligned with the apertures in the ears 17, 17.

As will now be understood, and as has previously been stated, the monitoring means includes one or more parts on one of the panels, and one or more co-operant parts on the other panel.

Figure 2:
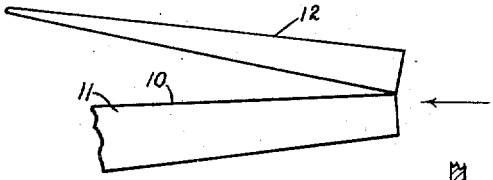
Fig. 2 is a similar view showing such wing with its outer panel in a folded or non-flying position.

As the parts are shown in Figs. 2 and 4, the flag portion 61 extends above the surface of the wing, indicating that the wings are unlocked. Here the bell-crank 30 and safety arm 31 are in normal positions, and, as aforesaid, the monitoring pin 45 is out of engagement with the bell-crank.

Figure 5:
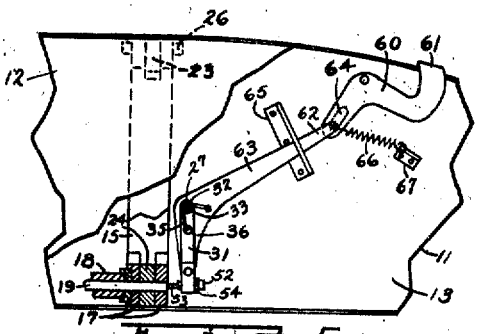
Fig. 5 is also a view similar to Fig. 3, except that the outer panel, shown partly in section and partly broken away, is illustrated as swung down into alignment and mating relation with the center panel, and the lock bolt is shown shot home.

When the outer panel 12 is extended as in Fig. 1 to interpose the ear 24 between the ears 17, and the plate 25 has forced the monitoring pin 44 into the hole 43 of the bell-crank 30 to lock the bell-crank to the safety arm 31 (see Fig. 7), the lock bolt 19 passes through the aligned apertures in the ears 17, 24, 17 and engages and thrusts against the adjustment bolt 52 on the safety arm 31, and so swings the bell-crank 30 to dispose the parts as shown in Fig. 5; the flag 61 being now positioned to signal that the panels are mated and in locked condition.

If the wings are not properly mated, the monitoring pin 44 in the safety arm 31 will not have engaged the bell-crank 30, and moving the lock-bolt 19 into locking position (Fig. 3) will cause swinging merely of the safety arm. The bell-crank will not be moved and the flag 61 will remain up, indicating that the wings are not locked.

An important feature of the present invention consists in requiring the following of the proper sequence of steps necessary to properly place the movable wing panel in extended position and lock it in place. That is to say, if the bolt is shot home before the ears on both of the wing panels are first aligned, it will be apparent that contact plate 25 cannot strike the monitoring pin 44 to force its end 47 into hole 46 to couple the safety arm 31 to the bell-crank 30, and accordingly the signal will remain in exposed or elevated position. On the other hand, when the steps of first lowering the movable panel, and then shooting the bolt home are followed, the lowering of the movable panel and the resultant alignment of the ears 17, 24 and 17 will enable contact plate 25 to engage monitoring pin 44 to couple safety arm 31 to bell-crank 30, so that when the bolt is then shot home, it will move safety arm 31 and bell-crank 30 as a unit and cause the signal to be lowered.

The invention described herein may be manufactured and/or used by or for the Government of the United States of America for governmental purposes without the payment of any royalties thereon or therefor.

What I claim is:

1. A lock-pin warning device for folding parts of airplanes, comprising, in combination with means for swingably connecting stationary and folding parts of the airplane, interengaging elements carried by both said parts and a lock-bolt movable to engage said elements in a predetermined manner to lock said parts together, a warning means, a member movable in response to a movement of said lock-bolt such that the latter will engage said elements as aforesaid, an independently movable member movable in response to a movement of said bolt, said second movable member operable by advance of said bolt in a locking direction and said first movable member operable by operation of said second movable member, means placing said signal under the control of said first movable member, said two movable members being normally operatively disconnected, and means for operatively connecting said two members for movement together, said means partially carried by one of said airplane parts and partially carried by the other airplane part.

2. A lock-pin warning device for folding parts of airplanes comprising a hinge means between a stationary part and a movable part of the airplane, in combination with interengaging elements on said airplane parts, a lock-bolt to engage said elements, guiding means for said bolt, a first arm and a second arm pivotally mounted on one of said airplane parts, a warning means operatively connected to said first arm, means carried by said second arm for engaging said first arm, said second arm being located for engagement by the bolt when moved in locking direction, yieldable means for normally rendering said engaging means inoperative, means carried by the other of said airplane parts and adapted for engagement with said engaging means to overcome said yielding means to render said engaging means operative when said interengaging elements are predeterminedly engaged.

3. A folding-wing lock-pin warning device for airplanes comprising, hinge members mounted on the stationary and the folding parts of the wing, interengaging ears and a lock-pin to engage said ears, a bell-crank and arm pivotally mounted on one of the wing parts, a warning means movably mounted on one of said wing parts and operatively connected to said bell-crank, engaging means carried by arm, said engaging means adapted for engagement with the bell-crank, the arm having an element adapted for engagement with the lock-pin, yieldable means connected to said bell-crank and to said arm to hold the arm in position to permit its engaging means to engage the bell-crank, means carried by the other of said wing parts and adapted for engagement with the engaging means carried by said arm to cause said engaging means to engage the bell-crank when an ear on the folding part of the wing moves into aligned position with an ear on the stationary part, whereby the arm is locked to the bell-crank to cause the bell-crank to be actuated to move the warning means to indicate locked position of said wing parts.

4. A folding-wing lock-pin warning device for airplanes comprising, hinge members mounted on the stationary and the folding parts of the wing, interengaging ears on the wing parts, a lock pin to engage said ears, a bell-crank and arm pivotally mounted on one of said wing-parts, a warning means pivotally mounted on one of said wing-parts and slidably connected to said bell-crank, engaging means mounted in said arm for engagement with the bell-crank, the arm having an element adapted for engagement with the lock-pin, spring means connected to said bell-crank and to said arm for positioning said engaging means to permit the arm to engage the bell-crank, means carried by the other of said wing-parts for engagement with said arm to force the engaging means thereof into engagement with the bell-crank when the ear on the folding part of the wing moves into aligning position with the ears on the stationary wing-part, and spring means connected to the stationary wing-part and to said bell-crank for normally urging the warning means to operative position prior to engagement of the lock-pin with said ears, whereby the warning means indicates the said wing-parts are in unlocked position.

5. A folding-wing lock-pin warning device comprising, hinge members mounted on the stationary and folding parts of the wing, interengaging ears on the wing-parts, a locking pin to engage said ears and connected to one of the ears, a bell-crank and arm pivotally mounted on one of said wing-parts, engaging means in said arm, means on one of said wing-parts adapted to force said engaging means into engagement with the bell-crank, the arm being adapted for engagement with the lock-pin, a warning means movably mounted on one of said wing-parts and operatively connected to said bell-crank, yieldable means connected to said bell-crank and normally urging the warning means to operative position prior to engagement of the lock-pin with the arm whereby the warning means indicates the said wing-parts are in unlocked position.

6. A warning device for airplanes having a fixed section and a movable section hinged together, ears carried by said sections and arranged for alignment when the sections are disposed in flying position, a movable lock-pin for engagement with all of said ears, a movable warning signal carried by one of the sections and having linkage connected to it, said linkage including a member adapted for engagement with the lock-pin when said lock-pin is advanced toward ear-engaging position, and coupling means by which said member is effectively coupled to the linkage to thereby cause said linkage to move the signal to "safe" position only when the ears on both wing sections are in alignment and the lock-pin is in engagement with all of the ears.

7. A warning device for airplanes having a fixed section and a movable section hinged together, comprising, ears carried by said sections and aligned when the sections are in operative position, a movable lock-pin for engagement with all of the ears, a movable member mounted on one of the sections, said member having an auxiliary member movable relatively to it but operatively associated with it and adapted to be engaged by the lock-pin when said lock-pin is advanced through an ear, coupling means by which said auxiliary member is coupled to and is movable with said movable member only when all of the ears are in alignment and the lock-pin has passed through all of the ears, and a signal connected to said movable member and moved to inoperative position by movement transmitted to said movable member through said auxiliary member when the latter is coupled to said movable member, said coupling means including coacting parts one carried by one section and one carried by the other.

8. A warning device of the character described comprising, a fixed wing section having a movable wing section hingedly attached to it, ears on both sections adapted to be aligned when the movable section is placed in operative position relative to the fixed section, a tie element for passage through the aligned ears on both of the wing sections, a movable warning signal carried by one of the wing sections and having a display part raised above the wing surface when the tie element is not engaged with all of the ears on both wing sections, an actuating member for said signal carried by one of the wing sections and having an independently movable part operatively associated with it and adapted to be engaged by the tie element when the tie element is in engagement with the ears, and coupling means operated only when the ears are aligned for coupling said movable part to the signal-actuating member to cause said member to move and lower the signal when said member is shifted by the tie element entering through all of the ears on both wing sections.

9. A folding-wing lock-pin warning device for airplanes comprising, a hinge means between the stationary and the folding panels of the wing, in combination with interengaging elements on the panels, said interengaging elements consisting of ears, a lock-bolt to engage said ears, a "safe" signalling device operable on predetermined mating of said ears and said bolt as required for locking said hinge means in position for safe flight, operating means responsive to movement of said lock-bolt toward locking condition to actuate said signalling device, and a monitoring means for said actuating means, said monitoring means including a monitoring element, said element and said actuating means carried each by a different one of the two wing sections, said monitoring means rendering said actuating means ineffective when said lock-bolt is thrown to locking position without engaging all of said ears.

10. A warning device for airplanes having a fixed and a movable wing section hinged together, said wing sections being provided with ears adapted to be aligned when the wing sections are in flying position, a bolt adapted to be extended through said ears, a signalling device operable on predetermined mating of the ears and the extension of the bolt through the mated ears, operating means responsive to movement of the bolt toward locking condition to actuate the signalling device, monitoring means for said operating means, said monitoring means including a monitoring element, said monitoring element and said operating means being both carried by the same wing section, said monitoring means rendering the operating means ineffective when the bolt is thrown to locking position without engaging all of the lugs .

11. A warning device for airplanes having a fixed and a movable wing section hinged together, said wing sections being provided with ears adapted to be mated when the wing sections are in flying position, a movable bolt adapted to be extended through said ears to thereby hold the wing sections in flying position, a movable signal carried by one of the wing sections, a pivoted operating member carried by the same wing section for operating the signal, a monitoring device also carried by the same wing section and carrying coupling means by which it is coupled to the operating member only when the ears on both wing sections are mated, means for holding the monitoring device uncoupled from the operating member while the ears on both wing sections are unmated, and means carried by the wing section on which the operating member is not carried for coupling the monitoring device and operating member when the ears are mated to thereby cause the operating member to operate the signal when the bolt is extended through the mated ears.

12. In a folding wing locking pin warning device for airplanes comprising hinge members mounted on the stationary and the folding parts of the wing and comprising interengaging lugs and a locking pin to engage said lugs and connected to one of the lugs, a bell crank and arm pivotally mounted on one of said wing parts, a warning means pivotally mounted on one of said wing parts and sildably connected to said bell crank, engaging means mounted in said arm, one of said engaging means adapted for engagement with means in the bell crank, the other of said engaging means adapted for engagement with the locking pin, means carried by the other of said wing parts and adapted for engagement with one of the engaging means in said arm to force said one engaging means into engagement with the means in said bell crank when the lug on the folding part of the wing moves into inter-engaging position with the lugs on the stationary wing part, whereby the arm is locked to the bell crank.

13. In a folding wing locking pin warning device for airplanes comprising hinge members mounted on the stationary and the folding parts of the wing and comprising inter-engaging lugs and a locking pin to engage said lugs and connected to one of the lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts and adapted for engagement with one of the engaging means in said arm to force said one engaging means into engagement with the means in said bell crank when the lug on the folding part of the wing moves into inter-engaging position with the lugs on the stationary wing part, whereby the arm is locked to the bell crank.

14. In a folding wing locking pin warning device for airplanes comprising hinge members mounted on the stationary and the folding parts of the wing and comprising inter-engaging lugs and a locking pin to engage said lugs and connected to one of said lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts and adapted for engagement with one of the engaging means in said arm to force said one engaging means into engagement with said means in said bell crank, when the lug on the folding part of the wing moves into inter-engaging position with the lugs on the stationary wing part, whereby the arm is locked to the bell crank, the bell crank actuated by said locking pin actuates the warning means to indicate locked position of said wing parts.

15. In a folding wing locking pin warning device for airplanes comprising hinge members mounted on the stationary and the folding parts of the wing and comprising inter-engaging lugs and a locking pin to engage said lugs and connected to one of said lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts adapted for engagement with one of the engaging means in said arm, to force said one engaging means into engagement with said means in said bell crank, when the lug on the folding part of the wing moves into inter-engaging position with the lugs on the stationary wing part, tension means connected to the stationary wing part, and to said bell crank for normally urging the warning means to operative position prior to engagement of the locking pin with said lugs, whereby the warning means indicate the said wing parts are in unlocked position.

16. In a folding wing locking pin warning device comprising hinge members mounted on the stationary and folding parts of the wing and comprising inter-engaging lugs and a locking pin to engage said lugs and connected to one of the lugs, a bell crank and arm pivotally mounted on one of said wing parts, engaging means in said arm, means on one of said wing parts adapted to force one of said engaging means into engagement with means in the bell crank, the other of said engaging means adapted for engagement with the said locking pin carried by one of said lugs, a warning means pivotally mounted on one of said wing parts and operatively connected to said bell crank, tension means connected to said bell crank, said tension means normally urging the warning means to operative position prior to engagement of the locking pin with said second-named engaging means whereby the warning means indicate the said wing parts are in unlocked position.

GEORGE D. EVANS.